2,795,510
INORGANIC MOLDING COMPOSITION

John S. Thompson, Detroit, Mich., assignor, by mesne assignments, to Parker Rust Proof Company, a corporation of Michigan No Drawing. Application October 22, 1952,
Serial No. 316,304

4 Claims. (Cl. 106—286)

The present invention relates to an inorganic molding composititon and more specifically relates to a dry free flowing granular material comprising asbestos and phosphoric acid.

Heretofore, it has been suggested to react asbestos with phosphoric acid under controlled temperature conditions and to immediately hot mold the mixture into the product desired. The heretofore known compositions have utilized relatively low concentrations of phosphoric acid or have utilized relatively large quantities of somewhat stronger acids so that the resultant mixture was subject to either a large degree of shrinkage on molding and curing or the resultant mixture required immediate pressing into the final product form. So far as is known, there has been no suggestion of the provision of a partially activated asbestos-phosphoric acid reaction product which is in a form suitable for convenient storage, transportation, and subsequent molding into a finished article an indefinite period of time after its original formation.

The primary object of this invention is to provide a partially activated asbestos-phosphoric acid mixture which is in the form of a dry free-flowing granular material having storage stability and the ability to be subsequently molded into a wide variety of articles having the combination of properties of high flexural strength, high resistance to heat, high resistance to conventional organic solvents and petroleum fractions and oils. The articles also have good electrical properties as an insulator.

A further object of this invention is to provide a method for rapidly producing inorganic molded products utilizing the molding compositions of this invention. Other objects and advantageous features of the invention will become apparent upon considering the disclosure in its entirety.

In accordance with this invention, it has been found that a dry, storage stable, free flowing granular moldable material may be formed by reacting chrysotile asbestos with phosphoric acid if the proportion of phosphoric acid and the conditions of reaction are controlled so that the reaction is carried to substantial completion and the phosphoric acid is uniformly distributed throughout the asbestos. In general, the molding compositions of this invention may be formed by reacting phosphoric acid having a concentration between 75% and 100% in an amount of about 15% to 35% with chrysotile asbestos fibers of relatively short fiber length. As a result of controlling the proportion of phosphoric acid to an amount not greater than about 35% by weight of the mixture, there is obtained a material which is only partially activated and is in the form of granules. By "partially activated" is meant that the reaction product is still capable of further reaction on the application of additional heat, pressure, or upon the provision of additional phosphoric acid or its equivalent. The asbestos is present in the reaction mixture in an amount in excess of that which is required to react with all of the acid that is added and the reaction is carried to substantial completion. The resultant material or reaction product is substantially neutral and free from any tendency to chemically change its form or, in other words, the material is relatively inert at room temperature.

In the formation of the granular molding material of this invention, it has been found that in order to avoid the formation of agglomerates or lumps which contain unreacted phosphoric acid and non-uniformly distributed free asbestos fibers, it is necessary to mix the phosphoric acid and asbestos fibers extremely vigorously. It is preferred to introduce the phosphoric acid in an atomized form by spraying the same into the asbestos fibers while the fibers are being vigorously agitated and to continue this agitation until the acid is uniformly distributed throughout the fibers and the chemical reaction is substantially complete. When starting with relatively short length asbestos fibers and following this procedure, the partially activated product is usually in the form of relatively small particles, the predominant portions of which are smaller than 14 screen mesh. It will be appreciated that any conventional mixing means may be employed such as, for example, differential rolls, conventional rotary mixers, dough mixers, ribbon mixers and the like and that satisfactory results will be obtained if the mixing is continued until a uniform distribution of the acid in the asbestos has been accomplished. By employing differential rolls or other conventional mixing apparatus, the resultant product may be in the form of flakes or particles having a size much greater than 14 screen mesh. In this event, it is preferred to subject the flaky product to hammer milling or other suitable grinding operations to reduce the particle size such that not more than about 5% will exceed 14 screen mesh.

The average size of the granules of the molding composition have a direct bearing upon the degree of compressibility of the material and the uniformity of the density of the molding product. Granules having a size greater than about 14 screen mesh do not flow well in the die cavity and tend to cause the formation of voids or fissures within the molded article. It is preferable that the average particle size of the granules approach 60 screen mesh, but it will be apparent that due to the vigorous agitation employed in the mixing operation, that the size of the individual particles will vary, and usually do vary between particles small enough to be classified as dust up to particles as large as 14 screen mesh. The particle size is similarly related to the density of the material and it has been found that for general purposes the density of the molding composition should be at least .6 and preferably should not exceed 1. Molding compositions having a density between .85 and .97 have been found to be relatively free flowing and to produce sound articles having a low degree of shrinkage upon cooling.

In order to avoid excessive shrinkage upon curing, it is desirable to introduce only minor proportions of water into the molding composition as a part of the original aqueous phosphoric acid ingredient. For this reason it has not been found desirable to use phosphoric acid having a concentration less than about 75%. Above about 75% concentration the amount of shrinkage attributable to this source can be tolerated and concentrations of phosphoric acid up to 100% may be satisfactorily employed. Proportions of phosphoric acid exceeding about 35% are undesirable because the residual water which remains in the composition even after the chemical reaction has apparently become completed, has some deteriorating effect on the useful life of the molding composition, that is, upon standing, the compositions tend to continue to react at room temperature such that the flexural strength after molding and curing is undesirably low. Additionally such materials are subject to increased shrinkage upon curing and are unsuitable for uses which require close tolerances and reproducibility from piece to piece. Proportions below about 15% phosphoric acid having a concentration between about 75% and 100% are insufficient to react with a sufficient proportion of the asbestos fiber to form a dry free-flowing product. For the majority of applications, it is preferred to employ 25%–35% phosphoric acid having a concentration between about 85% and 100%. The phosphoric acid does not necessarily have to be orthophosphoric acid and other forms of phosphoric such as pyrophosphoric, metaphosphoric, may be used separately or in combination with orthophosphoric acid.

Articles of various shapes may be molded in a conventional manner from the molding compositions of this invention. For example, a molding composition containing 33% of 75% phosphoric acid in admixture with asbestos fibers designated 7TF$_2$ in accordance with Quebec Asbestos Producers Association nomenclature, was formed in accordance with the above described spray method of admixing. The dry molding composition had a density of .928, good flow properties and was inserted into a die and a plurality of articles were molded under a pressure of 15 tons per square inch, removed from the die and baked for 2 hours at 350° F. The molded articles were found to have good flexural strength as determined by positioning the molded article on centers 2 inches apart and positioning increasing weight at the midpoint of the span until breakage occurred. The molded articles supported weights between 50 and 100 pounds.

A relatively sharp increase in flexural strength characteristics of articles molded from the compositions of this invention may be achieved by incorporating in the above-described mixture of asbestos and phosphoric acid, a small proportion of aluminum metal. Proportions of aluminum as low as .01% are beneficial in increasing flexural strength, but a more preferred range is .075% to 3%. As an example of the contribution by aluminum metal to the flexural strength of articles made therefrom, a mixture of 30% phosphoric acid (75% concentration) and 7TF$_2$ asbestos fibers was prepared by the above-described procedure. To a portion of this mixture 7.5% of 100% phosphoric acid was added, and to another portion 7.5% of 100% phosphoric acid in which had been dissolved approximately 1% of aluminum was added. Equal quantities of each mixture were positioned in the same die and molded under pressures of 7½ tons per square inch, removed and cured at 350° F. for 2 hours. The flexural strength of the molded product containing the .075% aluminum was 128 pounds whereas the other molded product had a flexural strength of 77 pounds. The presence of the aluminum in the molding composition has also been observed to cause a slight decrease in the shrinkage which is obtained upon subsequent curing and additionally to cause a slight decrease in compressibility of the molding composition. Although the advantage of the presence of aluminum metal in a molding composition is obtained by the addition of aluminum to the molding composition after the basic asbestos-phosphoric acid composition has been preliminarily formed, it is preferred to incorporate the aluminum metal directly into the basic composition. This is readily accomplished by admixing alumina, aluminum hydroxide or powdered aluminum in the desired proportion with the phosphoric acid prior to its admixture with the asbestos. A greater decrease in shrinkage is observed when the aluminum is incorporated directly into the basic admixture rather than being admixed secondarily and just prior to molding. Minor proportions of zinc, manganese, and iron also have been found to be beneficial in increasing the flexural strength of the molded product and may be used as a substitute for or in conjunction with aluminum. Zinc apparently decreases the tendency of the molded article to spring back and tends to eliminate the formation of side cracks in larger articles. Zinc, manganese or iron may be advantageously employed in amounts up to about 3%. Quantities above about 3% do not provide any detectable increase in strength.

The preferred procedure for molding articles from the molding compositions of this invention comprises making an addition of a secondary activating material to the molding composition just prior to the molding operation. Suitable activating agents for this purpose include water and phosphoric acid. An unexpectedly high increase in flexural strength of the molded article is obtained by the addition of the activating agent in this manner and although the mechanism of and the reason for the increase in strength is not completely understood, it is clear that the flexural strength is not dependent upon the total amount of water which is present. It is desirable, however, that the asbestos-phosphoric acid reaction product contain some retained water, preferably not less than about 7.5%. For example, a basic material was prepared in accordance with the above described method containing 25% phosphoric acid (85% concentration), and the amount of retained water therein after complete reaction was determined to be about 10%. A second material was made containing 20% phosphoric acid (100% concentration) and was found to contain 7.6% retained water. 3% of free water was added to the composition containing 7.6% retained water and an article molded at a pressure of 7½ tons per square inch removed from the die and cured at 400° F. for 2 hours. A second article was molded from the material containing 10% retained water at a pressure of 15 tons per square inch, removed and cured at 400° F. for 2 hours. The article molded from the molding composition to which the 3% free water was added had a flexural strength of 85 pounds as compared with 45 pounds for the article made from the composition containing 10% retained water. It is apparent that even though twice as much pressure was used in the pressing of the article to which no free water was added, and the total water present in both cases was comparable, that the addition of free water is superior to retaining the water in the composition itself. Similar increases in strength may be obtained by adding proportions of phosphoric acid between about 1% to 10% by weight of the mixture, the phosphoric acid having a concentration of 75% to 100%. It will be appreciated that the addition of an activating agent containing water provides an additional source for shrinkage upon the subsequent curing of the molded article. It is therefore preferable to employ the minimum quantity of activating agent which will provide the desired strength in the molded article. For the majority of applications 3% to 5% of phosphoric acid having a concentration of 85% to 100% is satisfactory.

If in quantity production it becomes desirable to vary the density of the molding composition slightly to overcome production errors or variations, this may be readily accomplished by adding to the molding composition minor proportions of magnesium oxide. In addition to increasing the density of the molding material, magnesium oxide also increases the flexural strength of the resultant molded article. In one instance a batch of basic material was prepared from asbestos and 25% of 85% phosphoric acid containing about 1.25% aluminum. The density of this composition was .816 gram per cc. Molded articles from each of these 2 batches were found to have flexural strengths of 115 pounds and 152 pounds without magnesium oxide and with magnesium oxide, respectively.

In applications which require a high degree of precision and closely controlled tolerances of the molded article, the addition of a small quantity of glycerin has been found to reduce shrinkage and increase controllability of the dimensions of the article.

Proportions of glycerin between about 1% and 5% may be used satisfactorily. A convenient manner of introducing glycerin into the molding composition is to incorporate the desired proportion of glycerin with the secondary activating agents described above.

Excellent results have been obtained from the use of short fiber length chrysotile asbestos with an aqueous phosphoric acid solution having the following composition, by weight:

| | Percent |
|---|---|
| 85% phosphoric acid | 94 |
| Zince oxide | 2.3 |
| Aluminum oxide | 3.7 |

Molding compositions prepared from the use of 25% to 35% of this composition, after storage for about nine months, were reactivated by adding 3% to 5% of water or the acid solution itself and articles molded therefrom exhibited strengths comparable to those obtained from articles molded therefrom just after its original preparation.

What is claimed is:

1. An inorganic molding composition consisting essentially of a substantially completely reacted admixture of chrysotile asbestos, 15% to 35% of phosphoric acid having a concentration of 75% to 100%, and up to 3% aluminum, said composition having the form of dry, free-flowing particles not more than 5% of which exceed 14 screen mesh in size, and a density of between .6 and 1.

2. An inorganic molding composition consisting essentially of a substantially completely reacted admixture of short fiber chrysotile asbestos, 25% to 35% phosphoric acid having a concentration of 75% to 100%, and 1% to 2.5% aluminum, said composition having the form of dry free-flowing granules not more than 5% of which exceed 14 screen mesh in size, a density of between .6 and 1 and a pH in the range of 6.5 to 7.5.

3. An inorganic molding composition consisting essentially of a substantially completely reacted admixture of chrysotile asbestos, 15% to 35% of an aqueous mixture consisting of 94% phosphoric acid having a concentration of 85%, 2.3% zinc oxide and 3.7% aluminum oxide, said composition having the form of dry free-flowing granules not more than 5% of which exceed 14 screen mesh in size, a density of between .6 and 1 and a pH in the range of 6.5 to 7.5.

4. An inorganic molding composition consisting essentially of a substantially completely reacted admixture of short fiber chrysotile asbestos, 15% to 35% of phosphoric acid having a concentration of 75% to 100%, .075% to 3% aluminum, and 1% to 3% magnesium oxide, said composition having the form of dry free-flowing granules not more than 5% of which exceed 14 screen mesh in size, a density of between .6 to 1.

References Cited in the file of this patent
UNITED STATES PATENTS

| 2,199,386 | Bass et al. | May 7, 1940 |
|---|---|---|
| 2,366,485 | Brink et al. | Jan. 2, 1945 |
| 2,455,758 | Greger | Dec. 7, 1948 |
| 2,592,521 | Thompson | Apr. 8, 1952 |